US011933259B2

(12) United States Patent
Aoyagi et al.

(10) Patent No.: US 11,933,259 B2
(45) Date of Patent: Mar. 19, 2024

(54) IGNITION TIMING CONTROL DEVICE AND CONTROL METHOD

(71) Applicant: YAMAHA HATSUDOKI KABUSHIKI KAISHA, Iwata (JP)

(72) Inventors: Shintaro Aoyagi, Shizuoka (JP); Yuya Ichikawa, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 18/121,022

(22) Filed: Mar. 14, 2023

(65) Prior Publication Data

US 2023/0296072 A1 Sep. 21, 2023

(30) Foreign Application Priority Data

Mar. 15, 2022 (JP) ................................ 2022-040153

(51) Int. Cl.
*F02B 61/04* (2006.01)
*F02P 5/152* (2006.01)

(52) U.S. Cl.
CPC .......... *F02P 5/1527* (2013.01); *F02B 61/045* (2013.01)

(58) Field of Classification Search
CPC .............................. F02B 61/045; F02P 5/1527
USPC ...... 123/1 A, 406.21, 406.29, 406.3, 406.31, 123/406.32, 406.59, 431
See application file for complete search history.

(56) References Cited

U.S. PATENT DOCUMENTS

| | | | | |
|---|---|---|---|---|
| 8,914,222 B2* | 12/2014 | Kusumoto | .............. | F02D 45/00 |
| | | | | 123/406.35 |
| 10,550,774 B1* | 2/2020 | Blake | .................... | F02D 35/027 |
| 11,692,523 B2* | 7/2023 | Huckaby | ............... | F02P 5/1523 |
| | | | | 123/406.29 |
| 2012/0024262 A1* | 2/2012 | Leone | ................... | F02P 5/1523 |
| | | | | 123/406.47 |
| 2013/0160739 A1* | 6/2013 | Suzuki | .................. | F02P 5/1502 |
| | | | | 123/406.47 |
| 2015/0211472 A1* | 7/2015 | Carlson | .................. | F02D 17/02 |
| | | | | 123/406.21 |
| 2018/0023530 A1* | 1/2018 | Shinohara | ............. | F02D 19/087 |
| | | | | 123/406.19 |

FOREIGN PATENT DOCUMENTS

JP 2-16364 A 1/1990

* cited by examiner

*Primary Examiner* — Erick R Solis
(74) *Attorney, Agent, or Firm* — Keating & Bennett, LLP

(57) ABSTRACT

An ignition timing controller includes a storage and a processor configured or programmed to function as an ignition timing control section and a knocking determining section. The storage stores at least one of a first ignition timing map associated with a first fuel or a second ignition timing map associated with a second fuel more likely to cause knocking of an internal combustion engine than the first fuel. The ignition timing control section controls the ignition timing based on the first ignition timing map by executing a timing retardation based on the first ignition timing map when it is determined that knocking of the internal combustion engine has occurred. The ignition timing control section controls the ignition timing of the internal combustion engine based on the second ignition timing map by executing a timing advancement correction based on the second ignition timing map when it is determined that the knocking of the internal combustion engine has not occurred.

13 Claims, 6 Drawing Sheets

IGNITION TIMING CONTROL DEVICE AND CONTROL METHOD

CROSS REFERENCE TO RELATED APPLICATIONS

This application claims the benefit of priority to Japanese Patent Application No. 2022-040153 filed on Mar. 15, 2022. The entire contents of this application are hereby incorporated herein by reference.

BACKGROUND OF THE INVENTION

1. Field of the Invention

The present invention relates to an ignition timing control device and a control method.

2. Description of the Related Art

There has been conventionally known an ignition timing control device for controlling the ignition timing of a watercraft internal combustion engine. An ignition timing control device for a watercraft internal combustion engine, disclosed in Japan Laid-open Patent Application Publication No. H02-16364, is embedded with a plurality of ignition timing characteristics set in accordance with types of fuel to be used and includes a selector switch for selecting one corresponding to the type of fuel actually used from the plural ignition timing characteristics.

In recent years, it has been intended to achieve contribution to Goal 14 "Conserve and sustainably use the oceans, seas and marine resources for sustainable development" of SDGs (Sustainable Development Goals) developed at the initiative of the United Nations, reduction in amount of emission of carbon dioxide, and so forth. Thus, a biofuel has just become the mainstream in, for instance, America because a reduction in the amount of emission of carbon dioxide can be expected as an advantageous effect of the biofuel. However, the ignition timing control device disclosed in Japan Laid-open Patent Application Publication No. H02-16364 requires a user to operate the selector switch for selecting an ignition timing characteristic corresponding to the type of fuel actually used. Thus, when the user selects a wrong ignition timing characteristic, it is concerned that fuel efficiency is deteriorated without taking full advantage of the characteristics of the type of fuel actually used.

SUMMARY OF THE INVENTION

Preferred embodiments of the present invention provide environmentally friendly ignition timing control devices.

An ignition timing control device according to a first preferred embodiment of the present invention controls an ignition timing of an internal combustion engine of a marine propulsion device. The ignition timing control device includes a storage and a processor configured or programmed to function as an ignition timing control section and a knocking determining section. The storage is operable to store at least one of a first ignition timing map or a second ignition timing map. The first ignition timing map is associated with a first fuel, whereas the second ignition timing map is associated with a second fuel that is more likely to cause knocking of the internal combustion engine than the first fuel. The ignition timing control section is operable to control the ignition timing of the internal combustion engine based on either the first ignition timing map or the second ignition timing map. The knocking determining section is operable to determine whether or not the knocking of the internal combustion engine has occurred in a range in which a rotational speed of the internal combustion engine is greater than or equal to a predetermined speed. The ignition timing control section is operable to control the ignition timing of the internal combustion engine based on the first ignition timing map by executing a timing retardation correction of the ignition timing based on the first ignition timing map when the knocking determining section determines that the knocking of the internal combustion engine has occurred. The ignition timing control section controls the ignition timing of the internal combustion engine based on the second ignition timing map by executing a timing advancement correction of the ignition timing based on the second ignition timing map when the knocking determining section determines that the knocking of the internal combustion engine has not occurred.

An ignition timing control device according to a second preferred embodiment of the present invention controls ignition timing of an internal combustion engine. The ignition timing control device includes a storage and a processor configured or programmed to function as an ignition timing control section and a knocking determining section. The storage is operable to store at least one of a first ignition timing map or a second ignition timing map. The first ignition timing map is associated with a first fuel, whereas the second ignition timing map is associated with a second fuel that is more likely to cause knocking of the internal combustion engine than the first fuel. The ignition timing control section is operable to control the ignition timing of the internal combustion engine based on either the first ignition timing map or the second ignition timing map. The knocking determining section is operable to determine whether or not the knocking of the internal combustion engine has occurred in a range in which a rotational speed of the internal combustion engine is greater than or equal to a predetermined speed. The ignition timing control section is operable to control the ignition timing of the internal combustion engine based on the first ignition timing map by executing a timing retardation correction of the ignition timing of the internal combustion engine based on the first ignition timing map when the knocking determining section determines that the knocking of the internal combustion engine has occurred. The ignition timing control section controls the ignition timing of the internal combustion engine based on the second ignition timing map by executing a timing advancement correction of the ignition timing based on the second ignition timing map when the knocking determining section determines that the knocking of the internal combustion engine has not occurred.

A control method according to a third preferred embodiment of the present invention relates to a control method for controlling an ignition timing of an internal combustion engine of a marine propulsion device. The control method includes storing at least one of a first ignition timing map associated with a first fuel or a second ignition timing map associated with a second fuel that is more likely to cause knocking of the internal combustion engine than the first fuel, controlling the ignition timing of the internal combustion engine based on either the first ignition timing map or the second ignition timing map, detecting a magnitude of the knocking of the internal combustion engine, determining whether or not the knocking of the internal combustion engine has occurred in a range in which a rotational speed of the internal combustion engine is greater than or equal to a predetermined speed, and either controlling the ignition timing of the internal combustion engine based on the first ignition timing map by executing a timing retardation correction of the ignition timing of the internal combustion engine based on the first ignition timing map when it is determined that the knocking of the internal combustion engine has occurred, or controlling the ignition timing of the internal combustion engine based on the second ignition timing map by executing a timing advancement correction of the ignition timing of the internal combustion engine based on the second ignition timing map when it is determined that the knocking of the internal combustion engine has not occurred.

In an ignition timing control device and an control method according to preferred embodiments of the present invention, the knocking determining section is operable to determine whether or not knocking has occurred in the range in which a rotational speed of the internal combustion engine is greater than or equal to a predetermined speed such that the ignition timing is suitable for a fuel to be used in that range. Accordingly, the occurrence of knocking is reduced or prevented such that an enhanced output of the internal combustion engine and an enhanced fuel efficiency is obtained. As a result, it is possible to provide an ignition timing control device that is environmentally friendly.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
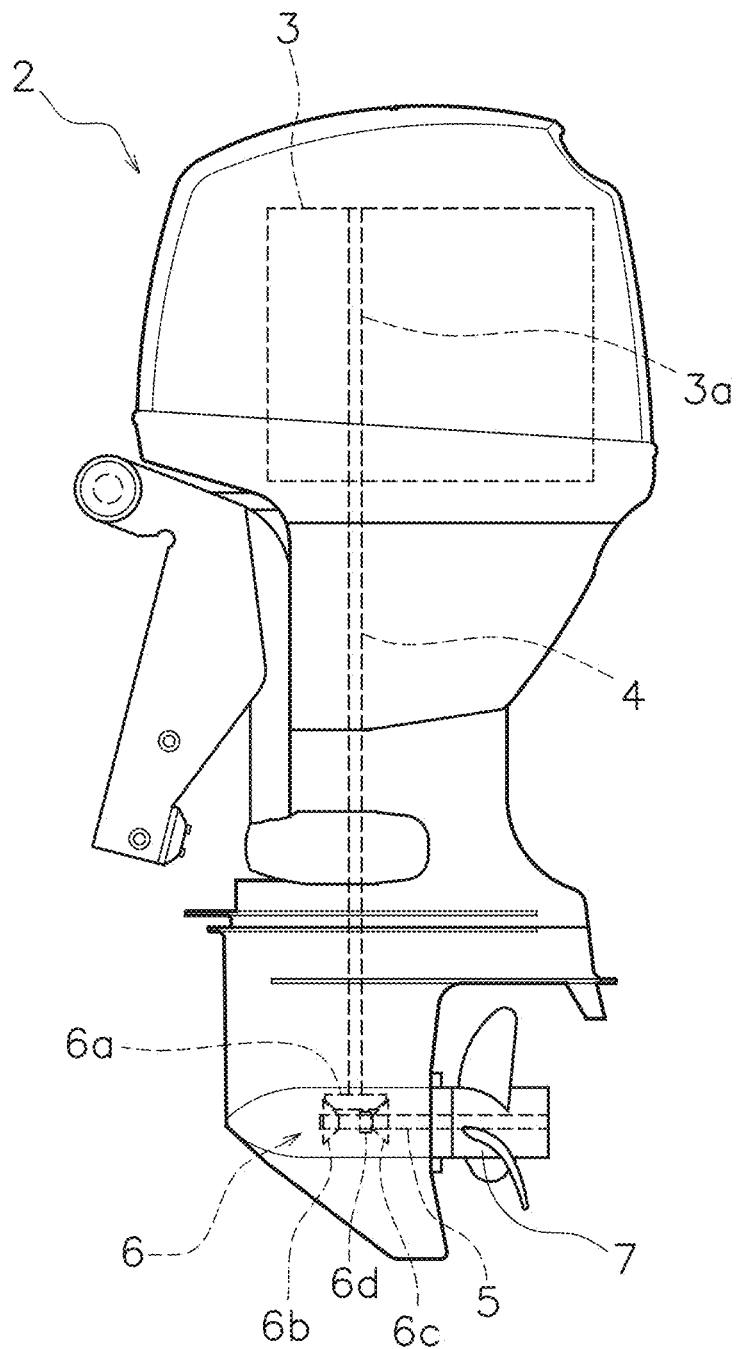
FIG. 1 is a side view of a marine propulsion device.

Preferred embodiments of the present invention will be hereinafter explained with reference to drawings. FIG. 1 is a side view of a marine propulsion device 2 including an ignition timing control device 10 according to a first preferred embodiment of the present invention. The marine propulsion device 2 according to the present preferred embodiment is an outboard motor to be attached to the stern of a watercraft (not shown in the drawings). The marine propulsion device 2 generates a thrust to propel the watercraft.

The marine propulsion device 2 includes an internal combustion engine 3, a drive shaft 4, a propeller shaft 5, and a shift mechanism 6.

The internal combustion engine 3 generates a torque to rotate the propeller shaft 5. The internal combustion engine 3 includes a crankshaft 3a. The crankshaft 3a extends in the vertical direction.

The drive shaft 4 is rotated by driving of the internal combustion engine 3. The drive shaft 4 extends in the vertical direction. The drive shaft 4 is connected to the crankshaft 3a.

The propeller shaft 5 extends in the back-and-forth direction of the marine propulsion device 2. A propeller 7 is attached to the propeller shaft 5 so as to be unitarily rotated therewith.

The shift mechanism 6 connects or disconnects the drive shaft 4 and the propeller shaft 5 to or from each other. The shift mechanism 6 switches the rotational direction of the propeller shaft 5.

As shown in FIG. 1, the shift mechanism 6 includes a drive gear 6a, a forward moving gear 6b, a backward moving gear 6c, and a dog clutch 6d. The drive gear 6a is unitarily rotated with the drive shaft 4. The forward moving gear 6b and the backward moving gear 6c are meshed with the drive gear 6a. Rotation of the drive shaft 4 is transmitted to the forward/backward moving gear 6b, 6c through the drive gear 6a. The dog clutch 6d is movable to a forward moving position, a neutral position, and a backward moving position. When the dog clutch 6d is set in the forward moving position, the propeller shaft 5 is connected to the forward moving gear 6b. When the dog clutch 6d is set in the neutral position, the propeller shaft 5 is disconnected from both the forward moving gear 6b and the backward moving gear 6c. When the dog clutch 6d is set in the backward moving position, the propeller shaft 5 is connected to the backward moving gear 6c.

Figure 2:
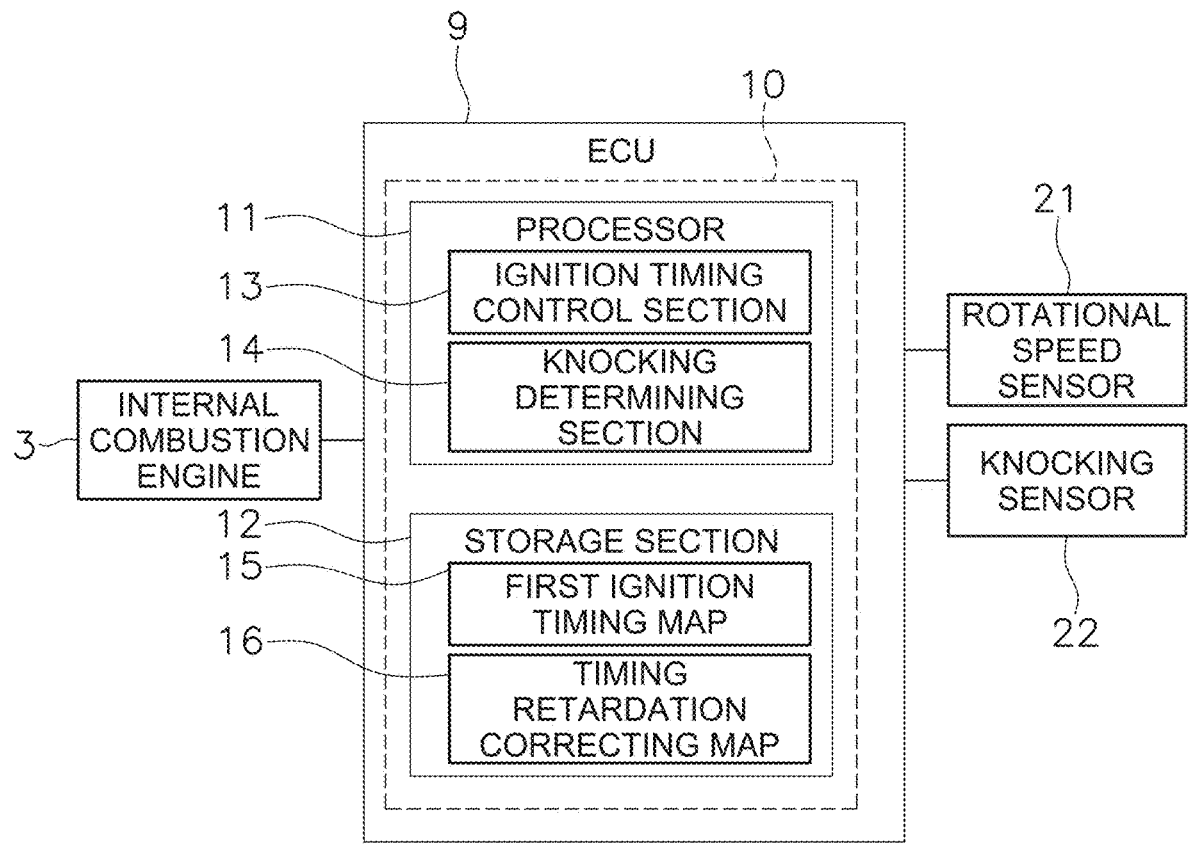
FIG. 2 is a block diagram showing a configuration of a control system for an internal combustion engine.

FIG. 2 is a block diagram showing a configuration of a control system for the internal combustion engine 3. The marine propulsion device 2 includes an ECU 9, a rotational speed sensor 21, and a knocking sensor 22.

The ECU 9 controls a variety of actions performed by the internal combustion engine 3. The ECU 9 controls a fuel injection device, a throttle valve, an ignition coil, and so forth in the internal combustion engine 3. The ECU 9 includes a processor 11 and a storage section 12. The processor 11 includes, for instance, a CPU (Central Processing Unit). The processor 11 executes programs to control the internal combustion engine 3. The storage section 12 includes memories such as a RAM (Random Access Memory) and a ROM (Read Only Memory). The storage section 12 stores the programs to be executed by the processor 11.

The rotational speed sensor 21 detects the rotational speed of the internal combustion engine 3. For example, the rotational speed sensor 21 detects the rotational speed of the crankshaft 3a and outputs, to the ECU 9, different signals depending on the rotational speed of the crankshaft 3a. The processor 11 in the ECU 9 calculates the rotational speed of the internal combustion engine 3 based on the signal outputted thereto from the rotational speed sensor 21.

The knocking sensor 22 detects the magnitude of knocking of the internal combustion engine 3. The knocking sensor 22 is configured to detect vibrations attributed to the knocking of the internal combustion engine 3. The knocking sensor 22 is attached to, for instance, a cylinder of the internal combustion engine 3. The knocking sensor 22 outputs, to the ECU 9, different signals depending on the magnitude of knocking of the internal combustion engine 3.

The ignition timing control device 10 controls the ignition timing of the internal combustion engine 3. The ignition timing control device 10 is realized by utilizing a section of the elements of the ECU 9. An ignition timing control section 13 is realized by utilizing the processor 11 and the storage section 12 in the ECU 9.

The storage section 12 stores a first ignition timing map 15 associated with a first fuel, and a timing retardation correcting map 16. The storage section 12 records therein the first ignition timing map 15 and the timing retardation correcting map 16 in advance. The first ignition timing map 15 is a collection of data regarding base ignition timing that is different depending on driving states of the internal combustion engine 3. The first ignition timing map 15 is suitable for the first fuel. The timing retardation correcting map 16 is used when a timing retardation correction is performed for the ignition timing of the internal combustion engine 3 based on the first ignition timing map 15.

The first fuel is a type of fuel that is less likely to cause knocking than a second fuel that is different from the first fuel. In other words, the second fuel is a type of fuel that is more likely to cause knocking than the first fuel. The first fuel is, for instance, a mixed fuel obtained by mixing alcohol into gasoline. The first fuel is higher in alcohol content than the second fuel. The first fuel is higher in ethanol content than the second fuel. The first fuel is higher in octane number than the second fuel. In the present preferred embodiment, the first fuel is an E10 fuel (a mixed fuel obtained by mixing ethanol into gasoline such that 10% of the entirety is ethanol). The first fuel is a biofuel and is also a mixed fuel obtained by mixing bioethanol into gasoline such that 10% of the entirety is bioethanol. The second fuel is, for instance, an E0 fuel in which alcohol is not contained. The first fuel may be a mixed fuel obtained by mixing ethanol into gasoline such that 5%, 20%, or 85% of the entirety is ethanol (i.e., an E5, E20, or E85 fuel). The first fuel may be a fuel consisting of 100% ethanol. The second fuel may be an alcohol-containing fuel.

The ignition timing control device 10 includes the ignition timing control section 13 and a knocking determining section 14. The ignition timing control section 13 and the knocking determining section 14 are realized by the processor 11.

The ignition timing control section 13 controls the ignition timing of the internal combustion engine 3 based on the first ignition timing map 15. The ignition timing of the internal combustion engine 3 is expressed by a crank angle from the top dead center in compression to an advancing timing side.

The knocking determining section 14 determines whether or not knocking of the internal combustion engine 3 has occurred based on the result of detection by the knocking sensor 22 in a high-speed range in which the rotational speed of the internal combustion engine 3 is higher than a predetermined speed. In the present preferred embodiment, the knocking determining section 14 determines whether or not knocking of the internal combustion engine 3 has occurred based on the result of detection by the knocking sensor 22 only in the high-speed range. The high-speed range is a range in which the rotational speed of the internal combustion engine 3 is greater than or equal to a predetermined speed, for example, 5500 rpm. The knocking determining section 14 outputs, to the ignition timing control section 13, different signals depending on whether or not knocking has occurred. The knocking determining section 14 may output a signal to the ignition timing control section 13 only when determining that knocking has occurred. For example, the knocking determining section 14 determines that knocking has occurred when the magnitude of knocking is greater than a predetermined value.

When the knocking determining section 14 determines that knocking of the internal combustion engine 3 has occurred, the ignition timing control section 13 executes a timing retardation correction of the ignition timing of the internal combustion engine 3 based on the first ignition timing map 15. For example, the ignition timing control section 13 determines the amount of retarding the ignition timing with reference to the timing retardation correcting map 16. The ignition timing control section 13 may determine the amount of retarding the ignition timing depending on the magnitude of knocking. For example, the timing retardation correcting map 16 is set depending on the rotational speed of the internal combustion engine 3 and/or the magnitude of knocking. Alternatively, the timing retardation correcting map 16 may be suitable for the second fuel. It should be noted that the amount of retarding the ignition timing may be constant during executing the timing retardation correction.

When the knocking determining section 14 determines that knocking of the internal combustion engine 3 has not occurred, the ignition timing control section 13 controls the ignition timing of the internal combustion engine 3 based on the first ignition timing map 15.

When the rotational speed of the internal combustion engine 3 becomes lower than the high-speed range during execution of the timing retardation correction, the ignition timing control section 13 cancels the timing retardation correction. In other words, when the rotational speed of the internal combustion engine 3 becomes lower than the high-speed range during execution of the timing retardation correction, the ignition timing control section 13 controls the ignition timing of the internal combustion engine 3 based on the first ignition timing map 15.

Figure 3:
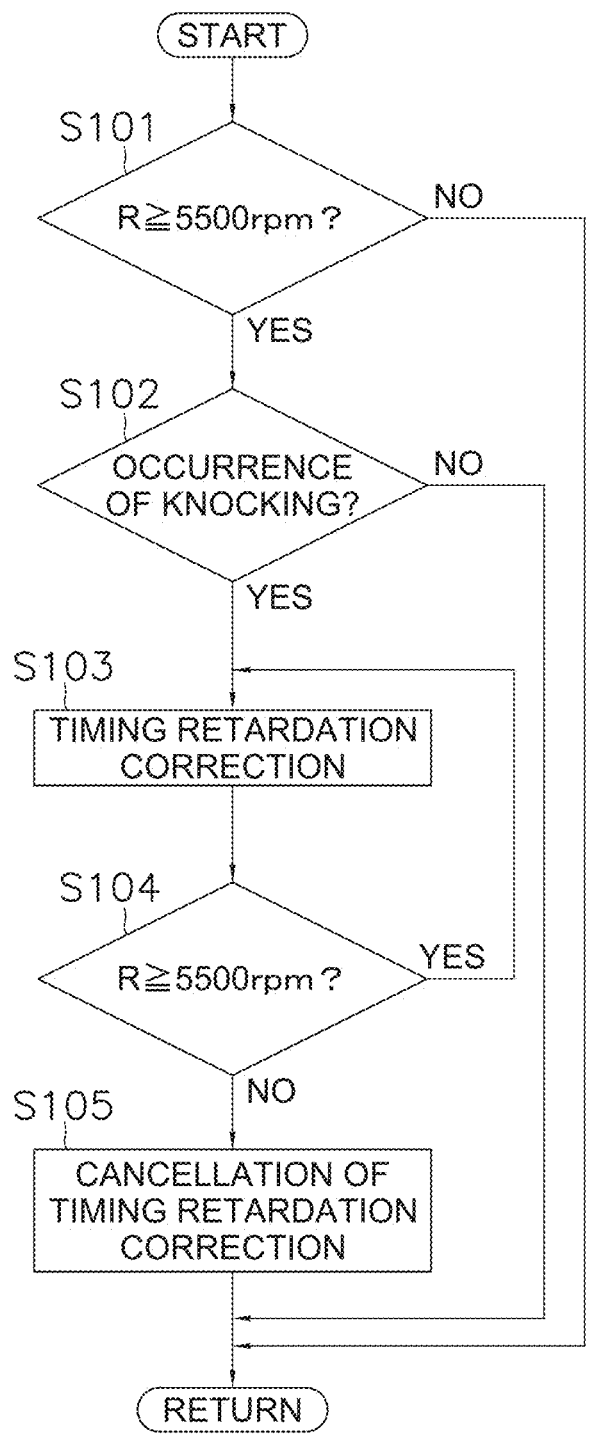
FIG. 3 is a flowchart exemplifying a series of processes of a timing retardation correction to be executed by an ECU.
Figure 4:
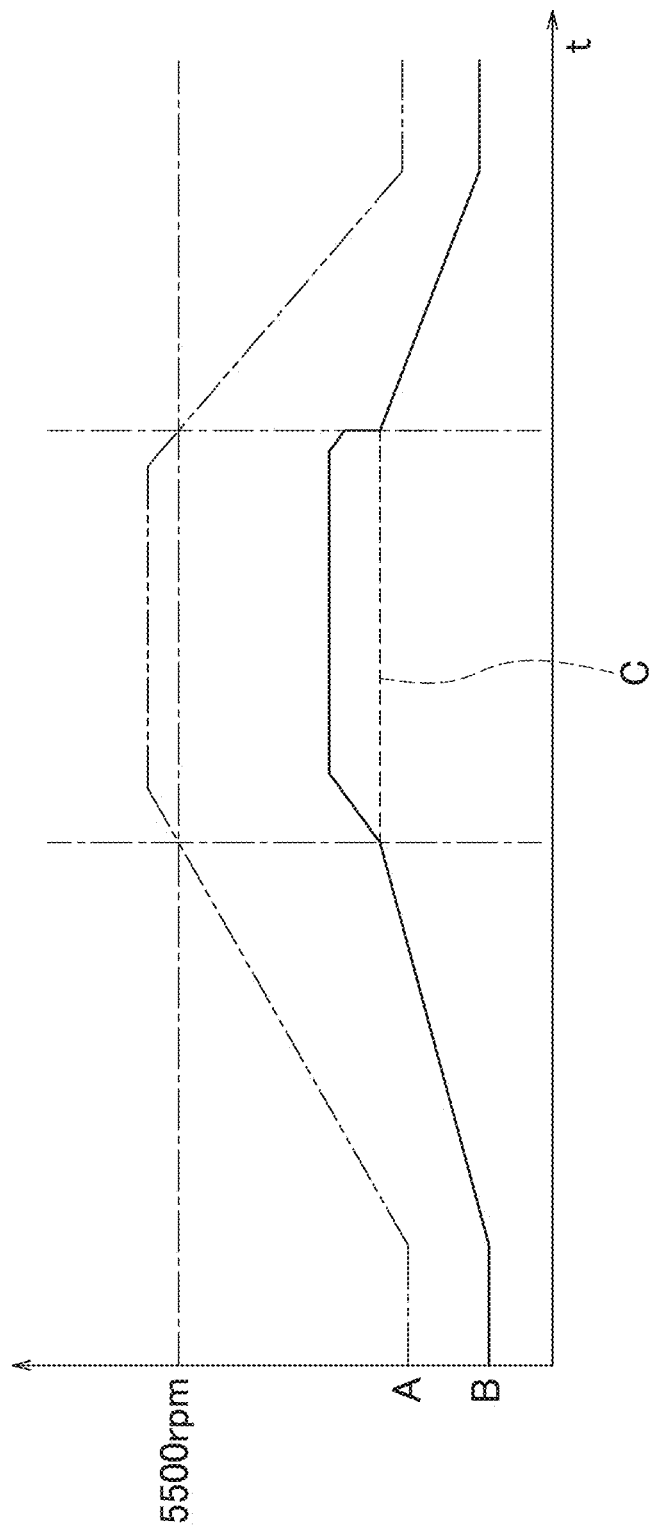
FIG. 4 is a chart for explaining the series of processes of the timing retardation correction.

FIG. 3 is a flowchart exemplifying a series of processes of timing retardation correction to be executed by the ECU 9. FIG. 4 is a diagram for explaining the series of processes of timing retardation correction. The horizontal axis in FIG. 4 represents time. Regarding dashed two-dotted line A, the vertical axis in FIG. 4 represents the rotational speed of the internal combustion engine 3. Regarding solid line B, the vertical axis in FIG. 4 represents the magnitude of the crank angle from the top dead center in compression to the advancing timing side. The solid line B corresponds to the first ignition timing map 15. On the other hand, dashed dotted line C corresponds to the timing retardation correcting map 16.

In step S101, the ECU 9 determines whether or not the rotational speed (R) of the internal combustion engine 3 falls in the high-speed range. Specifically, the ECU 9 calculates the rotational speed R of the internal combustion engine 3 based on the signal outputted thereto from the rotational speed sensor 21 and determines whether or not the rotational speed R of the internal combustion engine 3 is, for instance, greater than or equal to 5500 rpm.

When determining that the rotational speed R of the internal combustion engine 3 is less than 5500 rpm in step S101, the ECU 9 does not execute a series of processes in step S102 and thereafter. In this case, the ignition timing control section 13 controls the ignition timing of the internal combustion engine 3 based on the first ignition timing map 15.

When determining that the rotational speed R of the internal combustion engine 3 is greater than or equal to 5500 rpm in step S101, the ECU 9 executes the process in step S102.

In step S102, the ECU 9 determines whether or not knocking of the internal combustion engine 3 has occurred. Specifically, the ECU 9 determines whether or not knocking of the internal combustion engine 3 has occurred based on the signal to be outputted thereto from the knocking sensor 22. For example, ECU 9 determines that knocking of the internal combustion engine 3 has occurred when the magnitude of knocking of the internal combustion engine 3 is greater than a predetermined value. The ECU 9 determines that knocking of the internal combustion engine 3 has not occurred when the magnitude of knocking of the internal combustion engine 3 is less than or equal to the predetermined value. The process in step S102 is executed by the knocking determining section 14.

When determining that knocking of the internal combustion engine 3 has not occurred in step S102, the ECU 9 does not execute the series of processes in step S103 and thereafter. In this case, the ignition timing control section 13 controls the ignition timing of the internal combustion engine 3 based on the first ignition timing map 15.

When determining that knocking of the internal combustion engine 3 has occurred in step S102, the ECU 9 executes the process in step S103.

In step S103, the ECU 9 executes the timing retardation correction of the ignition timing of the internal combustion engine 3 based on the first ignition timing map 15. In other words, the ECU 9 shifts the ignition timing of the internal combustion engine 3 later than that based on the first ignition timing map 15. Specifically, the ECU 9 determines the amount of retarding the ignition timing of the internal combustion engine 3 with reference to the timing retardation correcting map 16 and controls timing retardation of the ignition timing of the internal combustion engine 3. The process in step S103 is executed by the ignition timing control section 13.

After executing the process in step S103, the ECU 9 executes the process in step S104. The process in step S104 is similar to that in step S101. Specifically, in step S104, the ECU 9 determines whether or not the rotational speed R of the internal combustion engine 3 is greater than or equal to 5500 rpm.

When determining that the rotational speed R of the internal combustion engine 3 is greater than or equal to 5500 rpm in step S104, the ECU 9 returns to execute the process in step S103. In other words, the ECU 9 keeps the ignition timing of the internal combustion engine 3 controlled under the timing retardation.

When determining that the rotational speed R of the internal combustion engine 3 is less than 5500 rpm in step S104, the ECU 9 executes the process in step S105. In step S105, the ECU 9 cancels the timing retardation correction executed in step S103 and controls the ignition timing of the internal combustion engine 3 based on the first ignition timing map 15. After executing the process in step S105, the ECU 9 returns to execute the process in step S101. Then, the ECU 9 repeatedly executes the series of processes in step S101 and thereafter.

In the ignition timing control device 10 described above, the knocking determining section 14 determines whether or not knocking has occurred in the high-speed range in which the rotational speed of the internal combustion engine 3 is high such that the ignition timing is suitable for a fuel to be used in the high-speed range. Accordingly, the occurrence of knocking is reduced or prevented such that an enhanced output of the internal combustion engine 3 and an enhanced fuel efficiency is obtained. As a result, it is possible to provide an environmentally friendly ignition timing control device 10.

Figure 5:
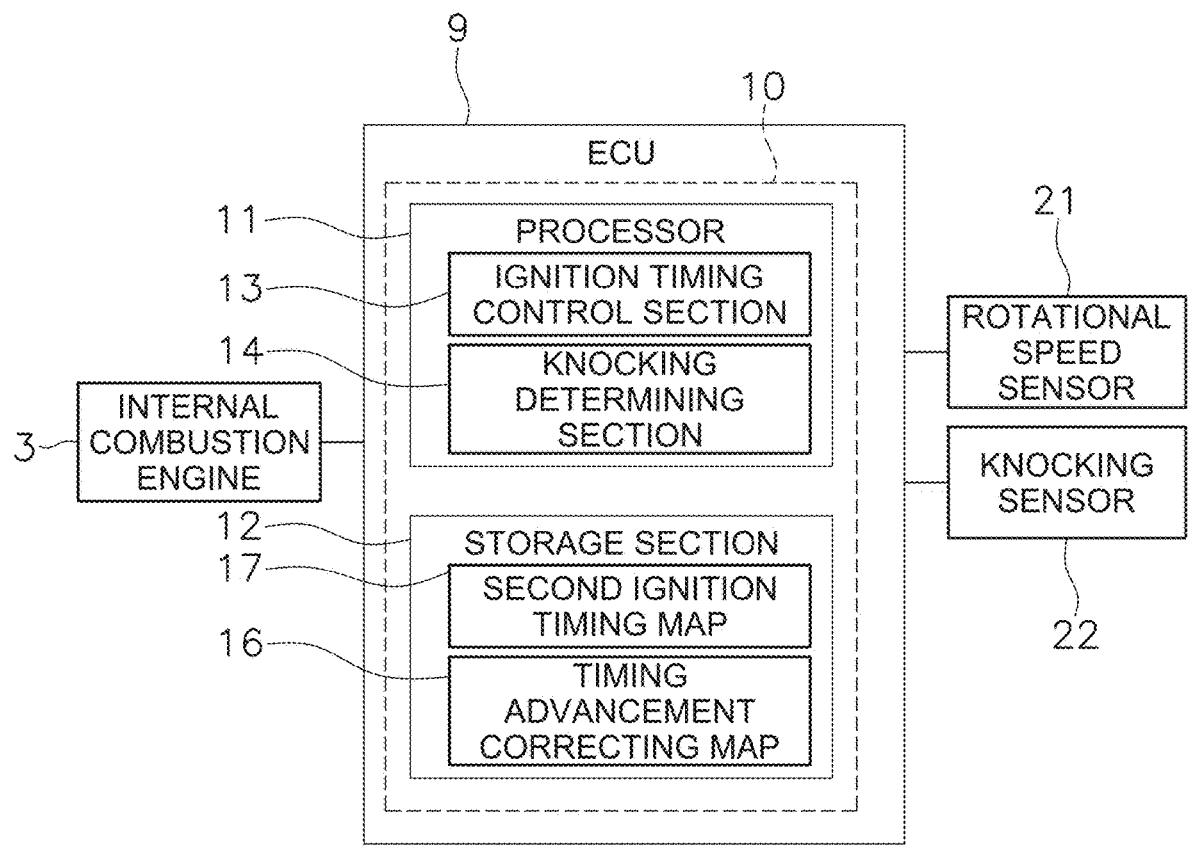
FIG. 5 is a block diagram showing a configuration of a control system for an internal combustion engine according to a second preferred embodiment of the present invention.

FIG. 5 is a block diagram showing a configuration of a control system for the internal combustion engine 3 according to a second preferred embodiment of the present invention. The following explanation will be provided mainly for elements different from corresponding ones in the first preferred embodiment.

The storage section 12 stores a second ignition timing map 17 associated with the second fuel, and a timing advancement correcting map 18. The storage section 12 records therein the second ignition timing map 17 and the timing advancement correcting map 18 in advance. The second ignition timing map 17 is a collection of data regarding base ignition timing that is different depending on driving states of the internal combustion engine 3. The second fuel is a type of fuel that is more likely to cause knocking of the internal combustion engine 3 than the first fuel. The second fuel is, for instance, the E0 fuel in which alcohol is not contained. The first fuel is, for instance, a mixed fuel obtained by mixing bioethanol into gasoline such that 10% of the entirety is bioethanol. The second ignition timing map 17 is suitable for the second fuel. The timing advancement correcting map 18 is used when a timing advancement correction is performed for the ignition timing of the internal combustion engine 3 based on the second ignition timing map 17.

The ignition timing control section 13 controls the ignition timing of the internal combustion engine 3 based on the second ignition timing map 17. When the knocking determining section 14 determines that knocking of the internal combustion engine 3 has not occurred, the ignition timing control section 13 executes the timing advancement correction of the ignition timing of the internal combustion engine 3 based on the second ignition timing map 17. The ignition timing control section 13 determines the amount of advancing the ignition timing with reference to, for instance, the timing advancement correcting map 18. For example, the timing advancement correcting map 18 is suitable for the first fuel.

When the knocking determining section 14 determines that knocking of the internal combustion engine 3 has occurred, the ignition timing control section 13 controls the ignition timing of the internal combustion engine 3 based on the second ignition timing map 17. It should be noted that, when the knocking determining section 14 determines that knocking of the internal combustion engine 3 has occurred, the ignition timing control section 13 may control the amount of advancing the ignition timing to be less than that based on the timing advancement correcting map 18 until the determination that knocking of the internal combustion engine 3 has not occurred by the knocking determining section 14.

The ignition timing control section 13 cancels the timing advancement correction when the rotational speed of the internal combustion engine 3 becomes lower than the high-speed range during execution of the timing advancement correction. In other words, the ignition timing control section 13 controls the ignition timing of the internal combustion engine 3 based on the second ignition timing map 17 when the rotational speed of the internal combustion engine 3 becomes lower than the high-speed range during execution of the timing advancement correction.

Figure 6:
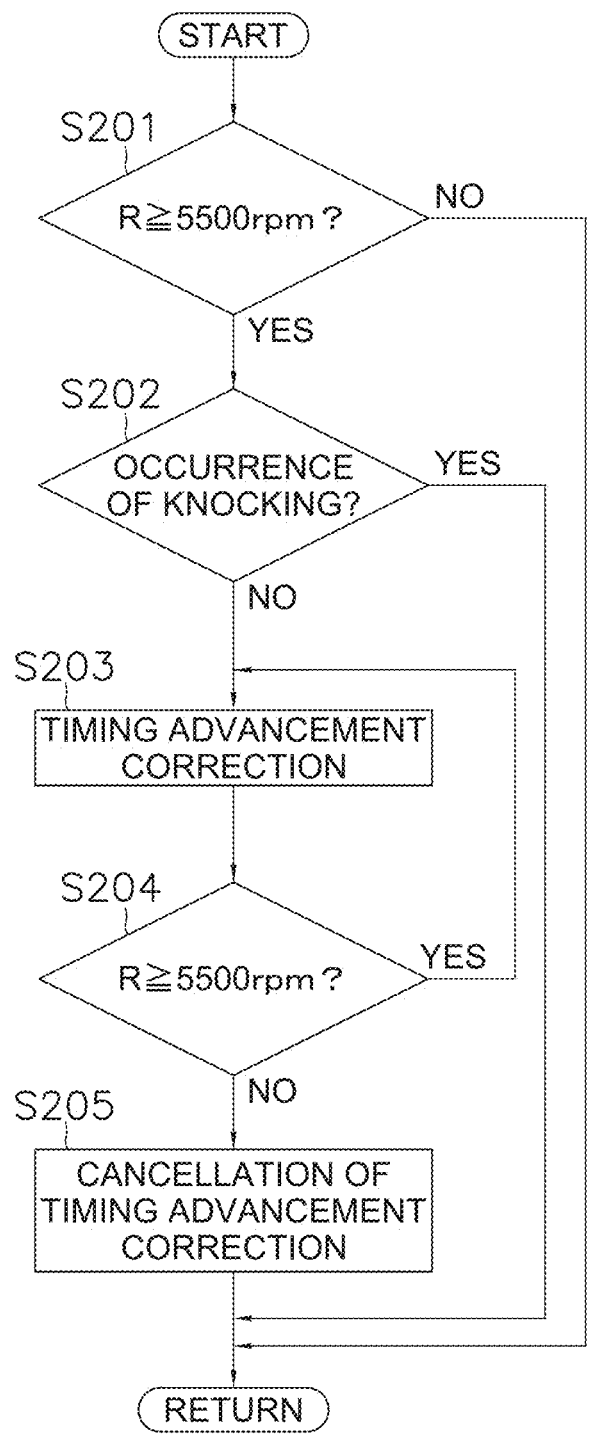
FIG. 6 is a flowchart exemplifying a series of processes of a timing advancement correction to be executed by an ECU according to the second preferred embodiment of the present invention.

FIG. 6 is a flowchart exemplifying a series of processes of timing advancement correction to be executed by the ECU 9 according to the second preferred embodiment.

The process in step S201 is similar to that in step S101, thus, detailed explanation thereof will be hereinafter omitted. It should be noted that, when determining that the rotational speed R of the internal combustion engine 3 is less than 5500 rpm in step S201, the ECU 9 does not execute a series of processes in step S202 and thereafter. In this case, the ignition timing control section 13 controls the ignition timing of the internal combustion engine 3 based on the second ignition timing map 17.

The process in step S202 is similar to that in step S102, thus, detailed explanation thereof will be hereinafter omitted. It should be noted that, when determining that knocking of the internal combustion engine 3 has occurred in step S202, the ECU 9 does not execute the series of processes in step S203 and thereafter. In this case, the ignition timing control section 13 controls the ignition timing of the internal combustion engine 3 based on the second ignition timing map 17. It should be noted that, when the knocking determining section 14 determines that knocking of the internal combustion engine 3 has occurred, the ignition timing control section 13 may control the ignition timing to be later than that based on the timing advancement correcting map 18 until the determination that knocking of the internal combustion engine 3 has not occurred by the knocking determining section 14.

When determining that knocking of the internal combustion engine 3 has not occurred in step S202, the ECU 9 executes the process in step S203.

In step S203, the ECU 9 executes the timing advancement correction of the ignition timing of the internal combustion engine 3 based on the second ignition timing map 17. In other words, the ECU 9 shifts the ignition timing of the internal combustion engine 3 to earlier than that based on the second ignition timing map 17. Specifically, the ECU 9 determines the amount of advancing the ignition timing of the internal combustion engine 3 with reference to the timing advancement correcting map 18 and controls timing advancement of the ignition timing of the internal combustion engine 3.

After executing the process in step S203, the ECU 9 executes the process in step S204. The process in step S204 is similar to that in step S101, thus, detailed explanation thereof will be hereinafter omitted.

When determining that the rotational speed R of the internal combustion engine 3 is greater than or equal to 5500 rpm in step S204, the ECU 9 returns to execute the process in step S203. In other words, the ECU 9 keeps the ignition timing of the internal combustion engine 3 controlled under the timing advancement.

When determining that the rotational speed R of the internal combustion engine 3 is less than 5500 rpm in step S204, the ECU 9 executes the process in step S205. In step S205, the ECU 9 cancels the timing advancement correction executed in step S203 and controls the ignition timing of the internal combustion engine 3 based on the second ignition timing map 17.

Preferred embodiments of the present invention have been explained above. However, the present invention is not limited to the preferred embodiments described above, and a variety of changes can be made without departing from the gist of the present invention.

In the preferred embodiments described above, a practical example has been explained that the ignition timing control device 10 is used for the marine propulsion device 2. However, the ignition timing control device 10 may be used for an engine of a four-wheeled vehicle or that of a straddled vehicle. Alternatively, the ignition timing control device 10 may be used for an inboard engine or an inboard engine outboard drive.

The storage section 12 may store both the first ignition timing map 15 and the second ignition timing map 17. The storage section 12 may store both the timing retardation correcting map 16 and the timing advancement correcting map 18.

The knocking determining section 14 may determine whether or not knocking of the internal combustion engine 3 has occurred based on the result of detection by the knocking sensor 22 in a range other than the high-speed range. The high-speed range may be arbitrarily changed in accordance with the configuration of the internal combustion engine 3.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An ignition timing control device for controlling ignition timing of an internal combustion engine of a marine propulsion device, the ignition timing control device comprising:
   a storage to store at least one of a first ignition timing map or a second ignition timing map, the first ignition timing map associated with a first fuel, and the second ignition timing map associated with a second fuel that is more likely to cause knocking of the internal combustion engine than the first fuel; and
   a processor configured or programmed to function as:
      an ignition timing control section to control the ignition timing of the internal combustion engine based on either the first ignition timing map or the second ignition timing map; and
      a knocking determining section to determine whether or not the knocking of the internal combustion engine has occurred in a range in which a rotational speed of the internal combustion engine is greater than or equal to a predetermined speed; wherein
   the ignition timing control section is operable to:
      control the ignition timing based on the first ignition timing map by executing a timing retardation correction of the ignition timing based on the first ignition timing map when the knocking determining section determines that the knocking of the internal combustion engine has occurred; or
      control the ignition timing based on the second ignition timing map by executing a timing advancement correction of the ignition timing based on the second ignition timing map when the knocking determining section determines that the knocking of the internal combustion engine has not occurred; and
   the ignition timing control section is operable to cancel the timing retardation correction or the timing advancement correction when the rotational speed of the internal combustion engine becomes lower than the range during execution of the timing retardation correction or the timing advancement correction.

2. The ignition timing control device according to claim 1, wherein
   the storage is operable to store the first ignition timing map; and
   the ignition timing control section is operable to control the ignition timing based on the first ignition timing map.

3. The ignition timing control device according to claim 1, wherein the first fuel has a higher alcohol content than the second fuel.

4. The ignition timing control device according to claim 1, wherein the first fuel has a higher ethanol content than the second fuel.

5. The ignition timing control device according to claim 1, wherein the first fuel has a higher octane number than the second fuel.

6. The ignition timing control device according to claim 1, wherein the first fuel is a biofuel.

7. An ignition timing control device for controlling ignition timing of an internal combustion engine, the ignition timing control device comprising:
- a storage to store at least one of a first ignition timing map or a second ignition timing map, the first ignition timing map associated with a first fuel, and the second ignition timing map associated with a second fuel that is more likely to cause knocking of the internal combustion engine than the first fuel; and
- a processor configured or programmed to function as:
  - an ignition timing control section to control the ignition timing of the internal combustion engine based on either the first ignition timing map or the second ignition timing map; and
  - a knocking determining section to determine whether or not the knocking of the internal combustion engine has occurred in a range in which a rotational speed of the internal combustion engine is greater than or equal to a predetermined speed; wherein
- the ignition timing control section is operable to:
  - control the ignition timing based on the first ignition timing map by executing a timing retardation correction of the ignition timing based on the first ignition timing map when the knocking determining section determines that the knocking of the internal combustion engine has occurred; or
  - control the ignition timing based on the second ignition timing map by executing a timing advancement correction of the ignition timing based on the second ignition timing map when the knocking determining section determines that the knocking of the internal combustion engine has not occurred; and
- the ignition timing control section is operable to cancel the timing retardation correction or the timing advancement correction when the rotational speed of the internal combustion engine becomes lower than the range during execution of the timing retardation correction or the timing advancement correction.

8. A control method for controlling ignition timing of an internal combustion engine of a marine propulsion device, the control method comprising:
- storing at least one of a first ignition timing map or a second ignition timing map, the first ignition timing map associated with a first fuel, and the second ignition timing map associated with a second fuel that is more likely to cause knocking of the internal combustion engine than the first fuel;
- controlling the ignition timing of the internal combustion engine based on either the first ignition timing map or the second ignition timing map;
- detecting a magnitude of the knocking of the internal combustion engine;
- determining whether or not the knocking of the internal combustion engine has occurred in a range in which a rotational speed of the internal combustion engine is greater than or equal to a predetermined speed;
- controlling the ignition timing of the internal combustion engine based on:
  - the first ignition timing map by executing timing retardation correction of the ignition timing based on the first ignition timing map when it is determined that the knocking of the internal combustion engine has occurred; or
  - the second ignition timing map by executing a timing advancement correction of the ignition timing based on the second ignition timing map when it is determined that the knocking of the internal combustion engine has not occurred; and
- canceling the timing retardation correction or the timing advancement correction when the rotational speed of the internal combustion engine becomes lower than the range during execution of the timing retardation correction or the timing advancement correction.

9. The control method according to claim 8, wherein
the first ignition timing map is stored as the at least one of the first ignition timing map or the second ignition timing map; and
the ignition timing of the internal combustion engine is controlled based on the first ignition timing map.

10. The control method according to claim 8, wherein the first fuel has a higher alcohol content than the second fuel.

11. The control method according to claim 8, wherein the first fuel has a higher ethanol content than the second fuel.

12. The control method according to claim 8, wherein the first fuel has a higher octane number than the second fuel.

13. The control method according to claim 8, wherein the first fuel is a biofuel.

* * * * *